May 6, 1930.  L. M. LEWIS ET AL  1,757,674
SIGNALING SYSTEM
Filed Nov. 18, 1924  3 Sheets-Sheet 1
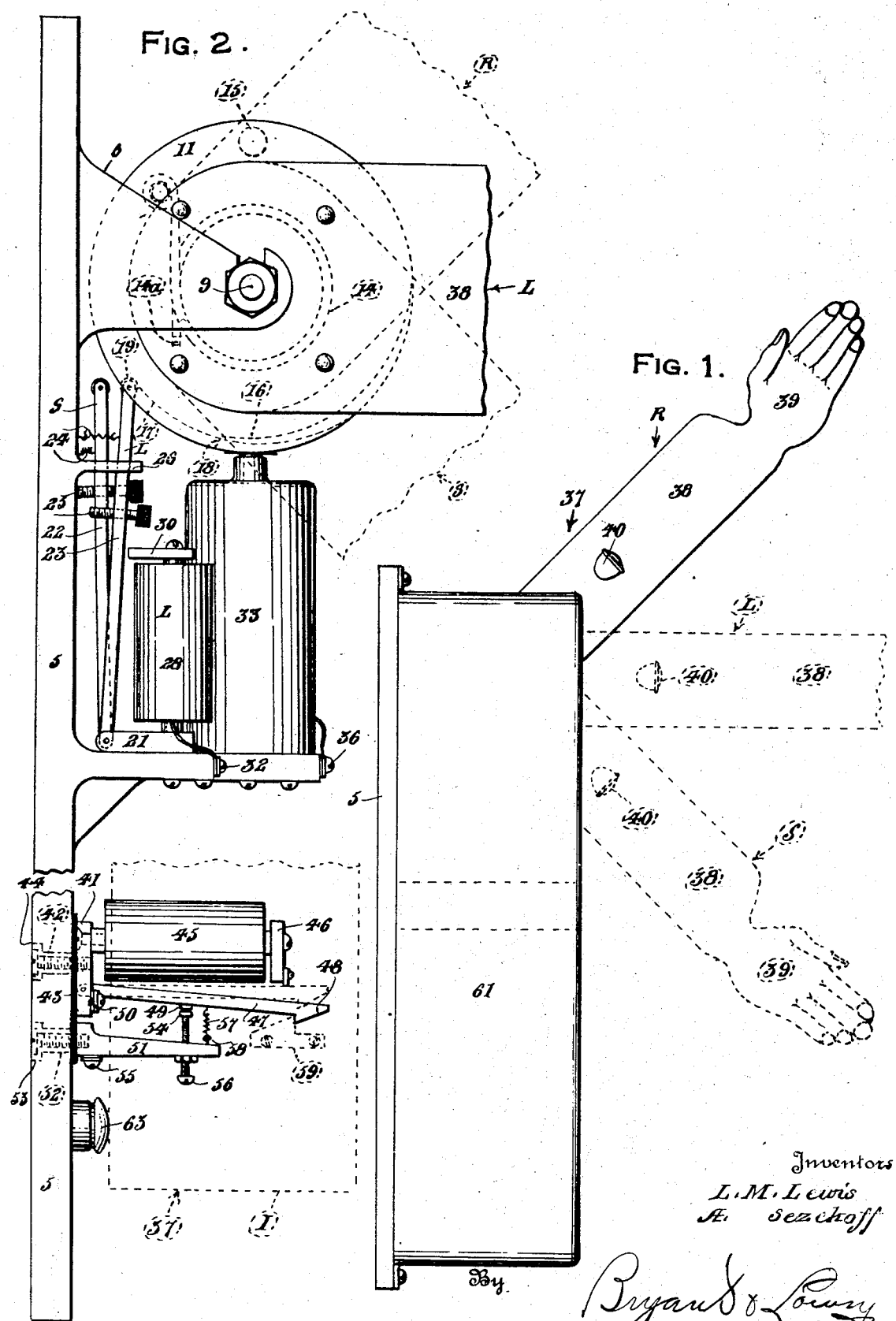

May 6, 1930.  L. M. LEWIS ET AL  1,757,674
SIGNALING SYSTEM
Filed Nov. 18, 1924  3 Sheets-Sheet 2
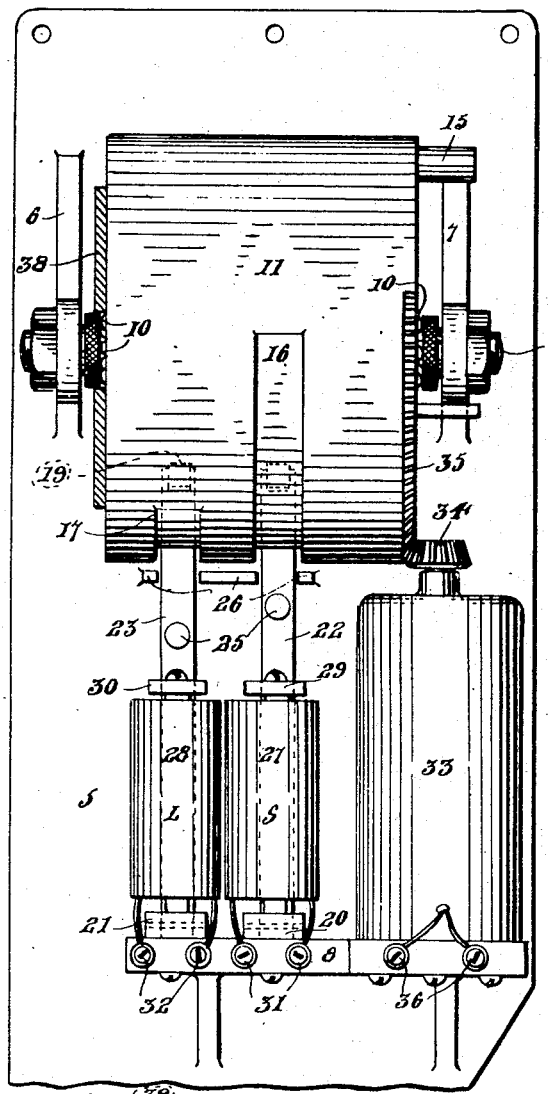
FIG. 3.
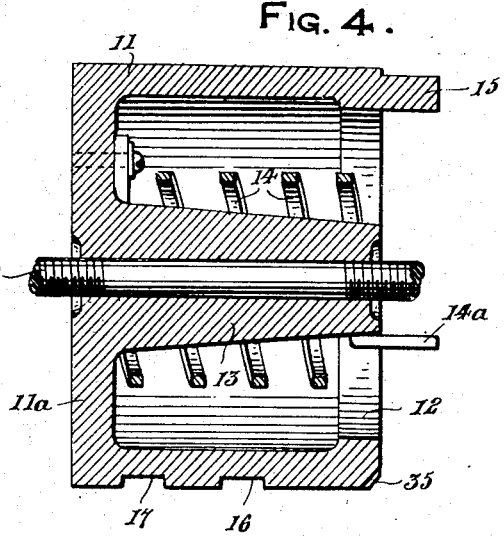
FIG. 4.
FIG. 6.
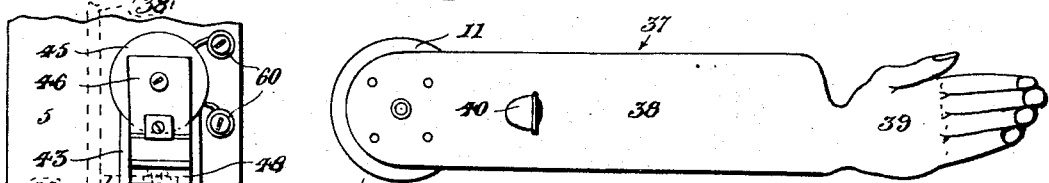
FIG. 5.
Inventors
L. M. Lewis
A. Sezekoff
By Bryant & Lowry
Attorneys

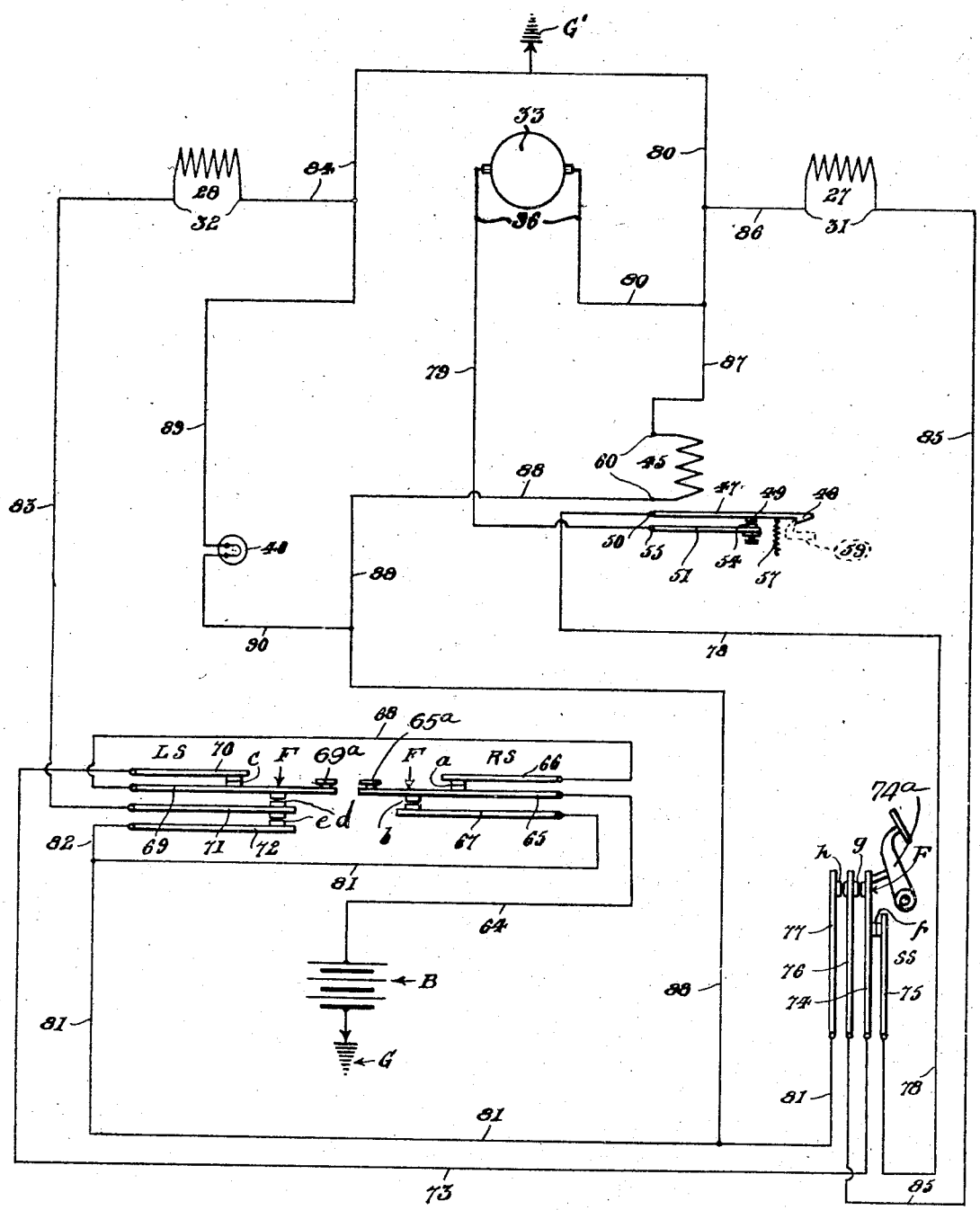

Patented May 6, 1930

1,757,674

UNITED STATES PATENT OFFICE

LLOYD M. LEWIS AND ANDREW SEZEKOFF, OF SACRAMENTO, CALIFORNIA

SIGNALING SYSTEM

Application filed November 18, 1924. Serial No. 750,562.

This invention relates to new and useful improvements in signaling systems.

The primary object of this invention is to provide a signaling system for automobiles, whereby the driver of a vehicle equipped with the same may warn pedestrians and drivers of other vehicles, located to the front, to the rear, or to the left of the equipped vehicle, of his intentions to change his direction or reduce his speed of travel.

A further object of the invention is to provide a signaling system which employs only one signaling element for producing the above noted results.

A still further object of the invention is to provide a signaling system of the above noted type which is very efficient in its operation and is of such a character that it is easily operated and may be quickly and easily repaired.

Other objects and advantages of the invention will be apparent during the course of the following description.

In the accompanying drawings forming a part of this specification and in which like numerals are employed to designate like parts throughout the same, Figure 1 is a front elevational view of the signaling element, shown in full lines in one position and in dotted lines in two different positions for illustrating the different positions assumed thereby when giving the various possible warning signals, and the casing employed for housing the mechanism which actuates the signaling element, Figure 2 illustrates in front elevation, partly broken away, the mechanism housed within the casing shown in Fig. 1, Figure 3 illustrates a side elevational view of the mechanism shown in Fig. 2, Figure 4 illustrates in vertical section the signal element carrying drum, Figure 5 shows in elevation the signaling element, its illuminating light, and its supporting drum, Figure 6 shows in side elevation the casing illustrated in Fig. 1 mounted upon the left side of a vehicle, shown in dotted lines, and Figure 7 is a diagrammatical view of the wiring system employed for operating the mechanism illustrated in the aforementioned figures.

In the drawings; wherein for the purpose of illustration is shown a preferred embodiment of this invention, the numeral 5 designates a supporting plate or panel which is intended to be suitably secured to the body portion of an automobile, such as in the manner illustrated in Fig. 6. This supporting plate or panel has formed integrally therewith or suitably secured thereto the laterally projecting spaced bracket arms 6 and 7 and the laterally projecting platform 8.

Suitably mounted in the bracket arms 6 and 7 is a supporting shaft 9 having journaled thereon, by means of antifriction bearings 10, a drum 11 which is open at one end, as at 12 and has a hub 13 formed integrally therewith. Suitably secured to the closed end 11ª of this drum is a spring 14 which encircles the hub 13 and has its free end 14ª projecting axially from the open end 12 of the drum for engagement with the bracket arm 7. This drum 11 is further provided with a laterally projecting stud 15 adapted for engaging the upper surface of the bracket arm 7 when the drum 11 is sufficiently rotated upon the shaft 9. It will be seen that the spring 14, when compressed by the rotation of the drum 11 in the proper direction to move the stud 15 away from the upper surface of the bracket arm 7, will be constantly tending or exerting its power to rotate the drum 11 in the opposite direction or in the proper direction for again bringing the stud 15 into engagement with the upper surface of the bracket arm 7.

The drum 11 is provided with the circumferentially extending grooves 16 and 17 which increase in depth from end to end for forming the shoulders 18 and 19 respectively at their deeper ends, as best illustrated in Fig. 2. It will be seen, by inspecting this Fig. 2, that the shoulders 18 and 19 are circumferentially spaced from each other.

Suitably mounted upon the platform 8 are the blocks 20 and 21 having pivotally connected to the rear ends thereof the perpendicularly extending detents 22 and 23 which are positioned respectively in vertical alinement with the grooves 16 and 17 formed in the drum 11.

In Fig. 2, the detents 22 and 23 are illustrated as having connected to the rear faces thereof the springs 24 which operate for retaining the said detents pulled toward the supporting plate or panel 5, the said detents each being provided with a movement limiting set screw 25 which will engage the supporting plate or panel 5 at its inner end for checking the movement of its respective detent toward the supporting plate or panel 5. The said plate or panel is further provided with the series of guiding lugs 26 which operate to prevent lateral displacement of the detents 22 and 23.

In Fig. 2 the detent 22 is shown as drawn inwardly to the limit of its movement in the direction of the supporting plate or panel 5, in which position, its free end is shown as being spaced inwardly from the drum 11. In this same figure, the detent 23 is shown as having been moved away from the supporting plate or panel 5 and has its upper end positioned in engagement with the shoulder 19 formed at one end of the groove 17. This detent 23 has been moved into this position or moved outwardly against the inward pull of the spring 24, by being attracted by the magnet 28, which is mounted upon the block 21 and extends perpendicularly therefrom for positioning its laterally projecting core 30 in operative relation to the intermediate portion of the detent 23. In Fig. 3, a magnet 27 is illustrated as extending perpendicularly from the block 20 and as having a laterally projecting core 29 which is operatively associated with the detent 22 and is employed for attracting the same to pull the said detent away from the supporting plate or panel 5 against the inward pull of its spring 24 whereby its outer end may be moved into the groove 16 formed in the circumference or periphery of the drum 11. The magnets 27 and 28 are electrically connected to the binding posts 31 and 32 respectively which in turn are intended to be connected to a source of electricity and suitable circuit making and breaking means.

The electric motor 33 is suitably mounted upon the platform 8 for causing its armature shaft to extend perpendicularly. The armature shaft of this motor 33 has mounted upon its upper projecting end the bevel gear 34 which is arranged to constantly mesh with the beveled teeth 35 formed on the edge of the drum 11. This electric motor 33 is electrically connected to the binding terminals 36 which in turn are to be suitably connected to a source of electricity and circuit making and breaking means whereby the said motor may be operated when desired. It is to be understood that this electric motor 33 functions to drive or rotate the drum 11 in the proper direction for causing the stud 15 to be moved outwardly and downwardly in respect to the supporting plate or platform 5 and the bracket arm 8, whereby the spring 14 will be compressed or tightened about the hub 13 of the drum 11.

Suitably secured to the outer face of the closed end 11ª of the drum 11 is the signaling element 37 which consists of the representation of a human arm and hand 38 and 39 respectively, the inner end of the arm 38 being the point at which the signaling element 37 is secured to the drum 11. This signaling element has mounted upon the arm portion thereof an illuminating light 40 which is arranged to direct its rays longitudinally along the arm 38 and hand 39, see Figs. 1 and 5.

The signaling element 37 is connected to the drum 11 in such a manner that when the arm 38 is in its full line position, as illustrated in Figs. 2 and 3, the spring 14 will be somewhat compressed or tightened and the free end of the detent 23 will be in engagement with the shoulder 19 in the groove 17. The signaling element is intended to be arranged in this position or in its truly horizontally extending position for indicating the driver's intention to change the direction of travel of the vehicle to the left, this position of the signaling element will be referred to in Figs. 1 and 2 by the reference character L. When the signaling element extends upwardly at approximately a 45° angle in respect to the position L, the signaling element is intended to indicate the driver's intention to turn his vehicle to the right, therefore, this position of the signaling element will be referred to by the character R. The signaling element is shown in full lines in this position in Fig. 1. When the said element is in its R position or right hand turn signaling position, the stud 15 carried by the drum 11 will be in engagement with the upper surface of the bracket arm 7 and will be retained in this position by the spring 14. The remaining position of the signaling element, as illustrated in Figs. 1 and 2, is intended to indicate the driver's intention to reduce his speed of travel or to stop, for this reason this downwardly, outwardly extending position will be referred to or designated by the character S, as shown in dotted lines in Figs. 1 and 2. The detent 22 is to be employed for holding the signaling element in its S, or stop indicating position. This detent 22 is moved outwardly by its magnet 27 so that its outer end will engage the shoulder 18 formed at one end of the groove 16 in the drum 11.

The signaling element 37, when not in any of its aforementioned signaling positions, depends from its supporting shaft 9 or in a substantially vertically extending position. This position will be referred to by the character I, for when it is in this position, it is inoperative. The signaling element is shown in dotted lines in Fig. 2 in this I or inoperative position. It will be remembered that movement of the drum 11 in the direction to permit the signaling element to assume its I position, will compress or tighten the spring 14. For this reason, suitable mechanism must be provided for retaining the signaling element in this inoperative position.

This mechanism includes the block 41 connected to the supporting plate or panel 5 by screws 42. This block is insulated from the plate or panel 5 by the piece of insulating material 43 and the insulating bushing 44 which surrounds the screw 42. Suitably connected to this block 41 and extending horizontally therefrom is an electric magnet 45 having its core 46 positioned with its operative face depending therefrom. The block 41 is further provided with a pivotally mounted latch 47 having a hooked end 48. A contact point 49 is carried by the underface of the latch 47 and is electrically connected with the binding post 50 thru the latch 47 and block 41. An arm 51 is connected to the supporting plate or panel 5 by the screw 52 which is insulated from the plate or panel by the bushing 53. The arm 51 is insulated from the plate or panel 5 by the piece of insulating material 43 referred to above. This arm carries an adjustable contact 54 which cooperates with the contact point 49 carried by the latch 47 for making and breaking a circuit to be described at a later point. This adjustable contact 54 is electrically connected to the binding terminal 55 by its supporting screw 56 and the arm 51. A spring 57 connects the latch 47 to the arm 51 and operates to draw the former toward the latter. This spring 57 is insulated from the arm 51 by the insulator 58, as best illustrated in Fig. 2. This arm holding mechanism further includes a keeper 59 suitably secured to the signaling element 37 and adapted for engagement with the hooked end 48 of the latch 47. The electric magnet 45 is suitably connected with the binding terminals 60, see Fig. 3, which in turn are to be connected to a suitable source of electricity and circuit making and breaking means for energizing the magnet 45 when desired.

In Figs. 1 and 6, the casing 61 is illustrated as being suitably secured to the supporting plate or panel 5 and acts as a housing for the mechanism previously referred to, that is with the exception of the signaling element when moved into its R, L or S position as shown in Fig. 1. This casing 61 has a perpendicularly extending slot 62 by means of which the signaling element may pass into and out of the said casing.

In Figs. 2 and 3, the supporting plate or panel 5 is illustrated as being provided with a cushioned stop 63 that is adapted for checking the movement of the signaling element when shifted into its I or inoperative position.

The operation of the mechanism so far described may be set forth as follows:—

It will be considered that the signaling element 37 is in its I or inoperative position and is entirely housed within the casing 61. The latch 47 is being held down into its signal element holding position by the spring 57 and the hooked end 48 of this latch 47 is in engagement with the keeper 59. The spring 14 is tightly compressed or wound around the hub 13 of the drum 11. Should the operator of the vehicle equipped with this signaling apparatus desire to warn pedestrians or drivers of surrounding vehicles of his intention to reduce the speed of travel of his vehicle, suitable circuit making and breaking means should be operated for establishing a circuit thru the magnet 27 for moving the detent 22 to cause its free end to be received within the groove 16 formed in the periphery of the drum 11. The magnet 45 should be energized, also, for moving the latch member 47 upwardly against the core 46 to release the signaling element 37. The spring 14 will then move the signaling element upwardly and outwardly upon its supporting shaft 9 until the free end of the detent 22 engages the shoulder 18 in the groove 16 whereupon the signaling element 37 will be stopped and held in its S position. To return the signaling element to its I or inoperative position, the electric motor 33 should be supplied with current for causing the same to rotate the drum 11 in the proper position for moving the signaling element 37 into the casing 61 or into its I position. To cause a left hand turn signal to be produced, the electric magnet 28 should be energized for moving the detent 23 to cause its free end to enter the groove 17 in the drum 11. The magnet 45 should again be energized for disengaging the latch 47 from the keeper 59. The spring 14 will then move the signaling element 37 outwardly and upwardly until the free end of the detent 23 engages the shoulder 19 in the groove 17. This detent will then stop the upward movement of the signaling element 37 and will hold the same in its L position. To return the signaling element to its I or inoperative position, the motor 33 is again energized and rotates the drum 11 for moving the signaling element 37 into the casing 61.

The right hand turn signal may be produced by energizing the magnet 45 for releasing the signaling element. The spring 14 will then move the signaling element 37 upwardly until the stud 15 is moved into engagement with the bracket arm 7 when the signaling element will be in its R position. The signaling element may again be returned to its inoperative position, within the casing 61, by energizing the motor 33. It is to be understood that the spring 14 is still somewhat compressed or under tension when the stud 15 is in engagement with the bracket arm 7 so that the signaling element 37 will be retained in this right turn or R position.

It is to be understood that the electric illuminating light 40 is to be automatically actuated every time the signaling element is moved out of the casing and into any of its signaling positions so that the said element will be properly illuminated during the hours of darkness.

It is to be understood, also, that when the motor 33 is energized for moving the signal element downwardly into its inoperative position from any of its operative positions, the current to the latch holding magnet 45 should be automatically broken so that the spring 57 may return the latch 47 to the proper position for holding the said signaling element in its I position.

It will be noticed that in Fig. 2, the latch 47 is retaining the signaling element in its I or inoperative position. The keeper 59, while engaged by the latch 47, holds the latter in such a position that the contact point 49 is slightly spaced from the adjustable contact point 54. This spacing of the elements 49 and 54 is brought about in view of the fact that the binding terminals 50 and 55 are connected in series with the electric motor 33 so that when the signaling element is being moved into its inoperative position by the motor 33, after the said element has been moved into a signaling position, the arrival of the keeper 59 at the hooked end 48 of the latch 47 will cause the latch to be moved upwardly for breaking the circuit to the motor 33 so that the arm will not be further driven thereby and the retaining of the contacts 49 and 54 in spaced relation will prevent the motor from being energized while the arm is in this inoperative position.

In the wiring diagram shown in Fig. 7 there are illustrated three switch structures RS; LS; and SS which are to be operated respectively for producing the right and left turn and the stop signals. In connection with each one of these switch structures, there is shown an arrow F which indicates the direction in which force is applied to the portions of the switches engaged by the points of the arrow for operating the switches to produce the desired signal. It is not believed necessary to illustrate the specific elements, such as push buttons or pedals, that may be used for manually producing the proper force against these switches, as such structure is not to be specifically claimed herein. It may be advisable to suggest, however, that the RS and LS switches may be provided with the required operating forces by push buttons as 69ª and 65ª respectively, while the switch SS may be suitably connected with the brake pedal or clutch pedal 74ª for obtaining the required force to operate the same. In this respect, should the switch SS be connected to a speed controlling pedal of the vehicle, the stop signal will be maintained as long as the pedal is depressed and as soon as the pedal is released, the force will be removed from this switch and it will be returned to its normal position. In connection with the switches RS and LS, push buttons may be provided and constructed in such a manner that upon being actuated for operating their respective switches, they may be retained in their actuated or depressed positions as long as desired, that is as long as the turn signals are desired, whereupon the push buttons may be released in any suitable manner.

This wiring system includes a battery B having one terminal grounded at G and having its remaining terminal connected by the wire 64 to the arm 65 of the switch structure RS. This arm 65 is intended to normally rest in the position shown for making contacts at —a— with the arm 66. When the force F is applied to this arm 65, the connection is broken at —a— and is established at —b— with the arm 67. The arm 66 is connected by the wire 68 to the arm 69 of the switch structure LS. This arm 69 is normally held in the position shown whereby contact is made at —c— with the arm 70. When the force F is applied to the arm 69, the same is moved for establishing contact at —d— with the arm 71 which in turn is moved, while still in contact with the arm 69, until contact is made at —e— with the arm 72.

The arm 70 is connected by the wire 73 with the arm 74 of the switch structure SS. This arm 74 normally rests in a position for establishing contact at —f— with the arm 75. When the force F is applied to the arm 74, the same is moved until contact is established at —g— with the arm 76, which arm is moved with the arm 74 until contact is established at —h— with the arm 77. The arm 75 is connected by the wire 78 thru the binding terminal 50 of the latch 47 which carries the contact point 49. The binding terminal 55 of the arm 51 is connected by the wire 79 to one binding terminal 36 of the motor 33. The remaining binding terminal 36 of the motor 33 is connected by the wire 80 to the ground G'.

The arm 67 of the switch structure RS is connected by the wire 81 to the arm 77 of the switch structure SS while this wire 81 is connected to the arm 72 of the switch structure LS by the wire 82.

The arm 71 of the switch structure LS is connected by the wire 83 to one binding terminal 32 of the magnet 28, the remaining binding terminal 32 of this magnet being connected to the ground G' by the wire 84.

The arm 76 of the switch structure SS is connected by the wire 85 to one binding terminal 31 of the magnet 27 which has its remaining binding terminal 31 connected by the wire 86 to the wire 80.

The wire 80 has connected thereto one binding terminal 60 of the magnet 45 by the wire 87 while the remaining binding terminal 60 of this magnet 45 is connected by the wire 88 to the wire 81. Connected in series between the wire 84 and 88, as by the wire 89 and 90, is the illuminating lamp 40.

The operation of the entire signaling system will now be described as follows:—

We will first assume that the signaling element 37 is in its I or inoperative position within the casing 61. The switch structures RS, LS, and SS are all in the conditions illustrated in Fig. 7, and the contact 49 is slightly spaced from the contact 54 for providing a break in the circuit to the motor 33.

Should the operator of the vehicle equipped with this signaling system desire to warn pedestrians and vehicle drivers of his intention to turn his vehicle to the right, force should be manually applied to the arm 65 in the direction of the arrow F of the switch structure RS. This movement of the arms 65 will make contact at —b— with the arm 67. A circuit will then be established from the ground G thru the battery B, the wire 64 to the arm 65, and from the arm 65 thru the contact —b— to the arm 67. The circuit will continue from this arm 67 thru the wire 81 to the wire 88. This wire 88 will carry the circuit to the magnet 45 which is connected by the wires 87 and 80 to the ground G'. The wires 89 and 90 will also connect the light 40 in series with the wire 88 and the ground G'. The magnet 45 will attract the latch 47 for moving its hooked end out of engagement with the keeper 59 whereupon the spring 14 will move the signaling element 37 outwardly and upwardly until the stud 15 engages the upper surface of the bracket arm 7. The signaling element 37 will then be in its R or right turn signaling position. The electric light 40 will be illuminated for permitting the signaling element to be clearly seen. After the right turn signal has been displayed for a desired length of time, the force F is removed from the arm 65 which will then return to the position illustrated in Fig. 7 whereby a contact is made at —a— with the arm 66. This will break the circuit to the magnet 45 which will permit the latch 47 to drop for placing the contact point 49 in engagement with the adjustable contact 54 carried by the arm 51. There will then be established a circuit from the ground G thru the battery B and the wire 64 to the arm 65. The circuit will then flow from the arm 65 thru the contact —a— to the arm 66 which is connected by the wire 68 to the arm 69 of the switch structure LS. This arm 69 is electrically connected at —c— to the arm 70 which is connected by the wire 73 to the arm 74 of the switch structure SS. This arm 74 is electrically connected at —f— to the arm 75 which is connected by the wire 78 to the latch 47. The circuit then continues thru the contacts 49 and 54 to the arm 51 and the wire 79 to one side of the motor 33. The remaining side of this motor is connected by the wire 80 to the ground G'. This circuit causes the electric motor 33 to operate for moving the drum 11 and signaling element 37 until the latter is entirely housed within the casing 61. The movement of the signaling element 37 into the casing 61 causes the keeper 59 of the said element to engage the latch 47, at its hooked end 48, for moving the said latch upwardly to cause the contact point 49 to be moved out of engagement with the adjustable contact 54 for breaking the circuit at this point to the electric motor 33. The latch 47 will be drawn into its signaling element holding position, as shown in full lines in Fig. 2, by the spring 57.

Should the operator of the vehicle desire to produce a left turn signal, force is applied at F to the arm 69 of the switch structure LS. Three circuits will then be established. The first extends from the ground G thru the battery B to the arm 65 of the switch structure RS by means of the wire 64. The circuit then continues from this arm 65 thru the arm 66 and the wire 68 to the arm 69 of the switch structure LS. This arm 69 is in contact at —d— with the arm 71 which is connected by the wire 83 to the magnet 28 which has its remaining binding post 32 connected to the ground G' by means of the wire 84. The energizing of the magnet 28 will cause the detent 23 to be attracted and moved away from the supporting plate or panel 5 for causing its free end to be moved into the groove 17 formed in the drum 11. The second circuit includes the ground G, the battery B, the wire 64, the arm 65, the contact —a—, the arm 66, and the wire 68 to the arm 69 of the switch structure LS. The circuit then extends thru the contacts —d— and —e— and the arm 71 to the arm 72 which is connected by the wire 82 to the wire 81. This wire 81 is connected by the wire 88 to one side of the magnet 45 which has its other side or terminal 60 connected to the ground G' by the wires 87 and 80. This circuit will energize the magnet 45 for causing the latch 47 to be elevated to release the signaling element 37 which will be moved outwardly and upwardly by the spring 14 until the free end of the detent 23 engages the shoulder 19 formed at the end of the groove 17. This detent will check the upward movement of the signaling element 37 and will hold the said element in its L or left turn signaling position, shown in full lines in Fig 2. The third circuit branches off of the wire 88 at the wire 90 and extends thru the electric light 40, the wire 89 and the wire 84 to the ground G'. This circuit energizes the light 40 for causing the signaling element to be illuminated so that the same may be clearly seen at night.

The signaling element 37 will be retained in its L position as long as the force F remains applied to the arm 69 of the switch structure LS. When this force is removed from the arm 69, the circuits to the magnets 28 and 45 and to the light 40 are all broken, whereby the detent 23 is returned to its normal inoperative position by its spring 24 and the spring 57 pulls the latch 47 into its position for establishing the motor circuit previously referred to. The energizing of this motor 33 will cause the same to drive the drum 11 for moving the signaling element 37 downwardly into the casing 61 when the keeper 59 will raise the latch 47 for breaking the circuit to the said motor.

The slow or stop signal may be produced by applying force F to the arm 74 of the switch structure SS. When such a force is applied to this arm 74, there will be three circuits established also.

The first of these three circuits will extend from the ground G thru the battery B and the wire 64 to the arm 65 of the switch structure RS. This arm 65 contacts at —a— with the arm 66 which is connected by the wire 68 to the arm 69 of the switch structure LS. This arm 69 contacts at —c— with the arm 70 which is connected by the wire 73 to the arm 74 of the switch structure SS. This arm 74 contacts at —g— with the arm 76 which is connected by the wire 85 to one binding terminal 31 of the magnet 27 which has its remaining terminal 31 connected by the wires 86 and 80 with the ground G'. This circuit energizes the magnet 27 for causing the same to attract the detent 22 to move the same against the pull of its spring 24 outwardly away from the supporting plate or panel 5. This movement of the detent 22 will place its free end in the groove 16 formed in the drum 11.

The second circuit will be taken up from the wire 73 which receives its supply of current in a manner just described. This wire 73 is connected to the arm 74 of the switch structure SS which contacts at —g— with the arm 76. This arm 76 in turn contacts at —h— with the arm 77 which is connected by the wire 81 with the wire 88. This wire 88 extends to one terminal 60 of the magnet 45 which has its remaining terminal 60 connected by the wires 87 and 80 to the ground G'. This circuit will energize the magnet 45 for causing the upward movement of the latch 47 to disengage its hooked end 48 from the keeper 59 of the signaling element 37. The spring 14 will then move this signaling element outwardly and upwardly until the free end of the detent 22 engages the shoulder 18 formed at the end of the groove 16. This engagement of the free end of the detent 22 with the shoulder 18 will check the upward movement of the signaling element for stopping the same when in its S or stop signaling position as shown in Figs. 1 and 2.

The remaining of the third circuits extends from the wire 88, which is included in the circuit to the magnet 45, and includes the wires 90, 89 and 84 by means of which the light 40 is connected in series with the ground G' and the wire 88. The energizing of this light 40 will illuminate the signaling element 37.

To return the signaling element 37 to its I or inoperative position within the casing 61, the force F is removed from the arm 74 of the switch structure SS and the three circuits just referred to will be broken. The breaking of the circuit to the magnet 45 will permit the latch 47 to drop or be pulled downwardly by the spring 57 for causing the contact point 49 to engage the contact 54. A circuit will then be established which will include the motor 33. The energizing of this motor 33 will return the signaling element to its inoperative position in the same manner as described in connection with the returning of the signaling element to such position after having been moved in its R and L signaling positions.

It will be clearly seen, by those skilled in the art, that after applying force at F to the arm 74 of the switch structure SS for causing the signaling element 37 to be held in its S position, the removal of this force F from the arm 74 and the applying of force at F to the arm 69 of the switch structure LS, will break the old circuits and establish the new circuits for causing the signaling element 37 to be stopped in its L or left turn signaling position. In a similar manner, the force may be removed from the switch structure LS and applied at F to the arm 65 of the switch structure RS for changing the signal from the left turn to the right turn. The switches may also be operated for permitting the signaling element to be changed from the stop signal to the right turn signal by removing the force from the switch structure SS and applying force to the switch structure RS. To change the signal from right turn to left turn or stop or from left turn to stop, the signaling arm 37 must first be returned to its inoperative or I position, it being impossible to make these changes in the same manner as the changes are made from the stop to the left turn or right turn or from the left turn to the right turn.

It is believed advisable to specifically call attention to the fact that when the spring 14 is moving the drum and the signaling element, the constant meshing of the bevel gear 34 with the teeth 35 of the drum 11 will cause the armature of the motor 33 to act as a drag upon the signaling element and drum thereby preventing too rapid upward movement of the signaling element.

It is now believed that the method of constructing and the manner of operating this signaling system will be clearly understood by those skilled in the art and that no further explanation is deemed necessary.

It is to be understood that the form of this invention herewith shown and described is to be taken as a preferred example of the same and that various changes in the shape, size and arrangement of parts may be resorted to without departing from the spirit of the invention or the scope of the subjoined claim.

Having thus described the invention, we claim:—

A signaling apparatus of the type described comprising a rotary hollow drum, a signal arm attached thereto, a spring located within said drum and connected thereto for rotating the drum to signaling position, electromagnetic means for rotating the drum in the opposite direction, automatically controlled electro-magnetic detents for arresting the rotation of said drum under the action of said spring, at different predetermined positions, means for locking the signal arm in a non-signaling position, and electro-magnetic means for releasing the locking means, said drum being formed with peripheral grooves spaced longitudinally thereof, of gradually increasing depth, providing shoulders at their inner ends for the engagement of said detents, said shoulders being spaced peripherally of the drum, means being provided for energizing one of the electro-magnets of the detents and the electro-magnet of the locking means.

In testimony whereof we affix our signatures.

LLOYD M. LEWIS.
ANDREW SEZEKOFF.